April 1, 1941.  E. C. MANDERFELD  2,236,509
OPTICAL MOUNTING
Filed April 16, 1940   2 Sheets-Sheet 1
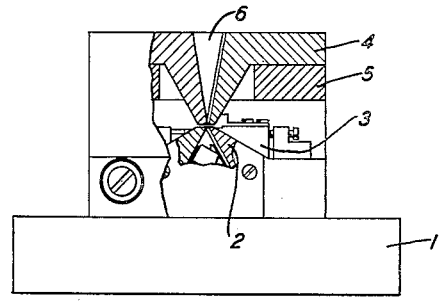
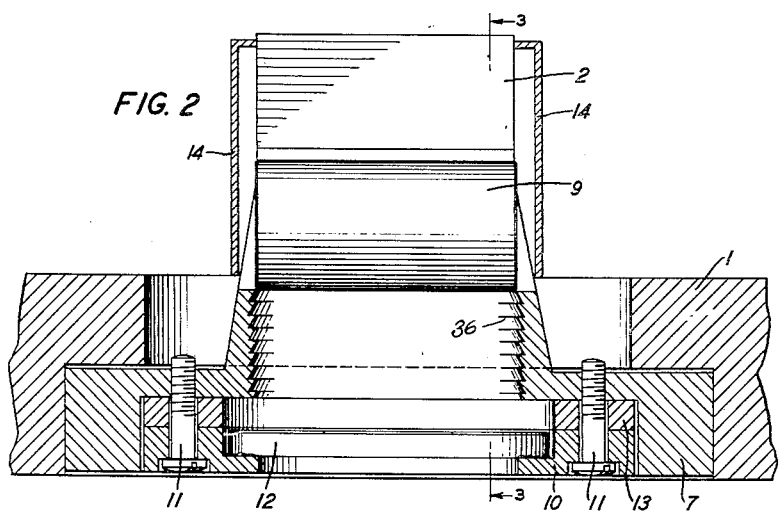
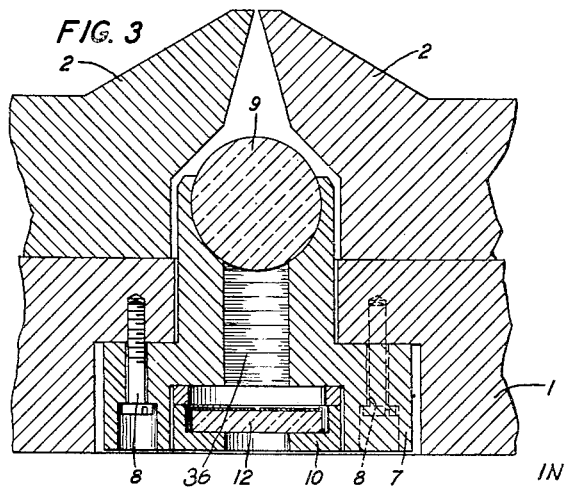
INVENTOR
E. C. MANDERFELD
BY
ATTORNEY

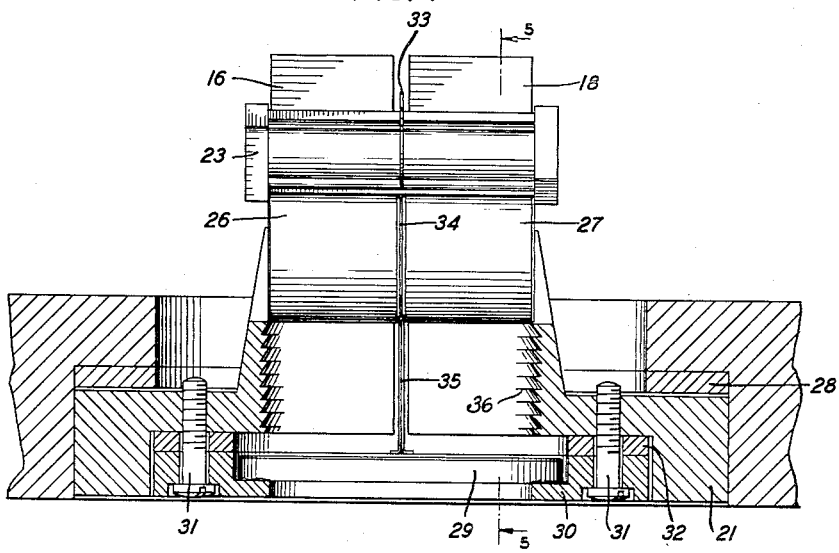
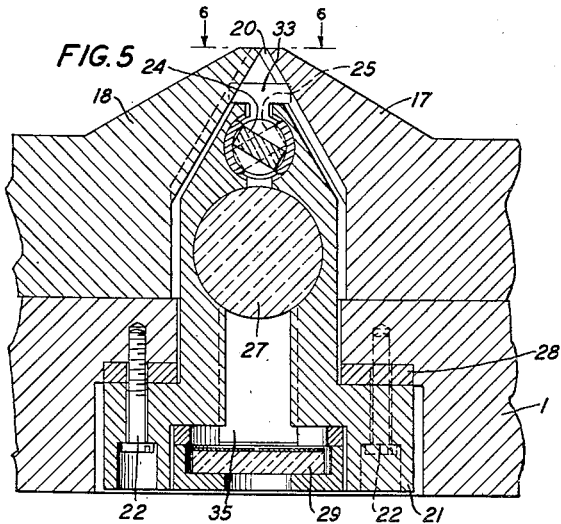
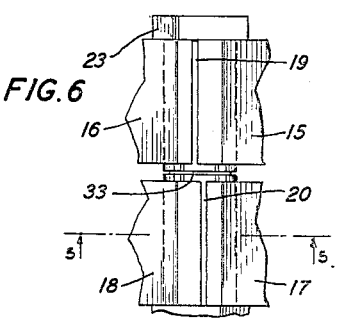

Patented Apr. 1, 1941

2,236,509

UNITED STATES PATENT OFFICE 2,236,509

OPTICAL MOUNTING

Emanuel C. Manderfeld, Los Angeles, Calif., assignor to Electrical Research Products, Inc., New York, N. Y., a corporation of Delaware Application April 16, 1940, Serial No. 329,853

10 Claims. (Cl. 88—61)

This invention relates to ribbon light valves employed in film sound recording systems and particularly to improvements in the construction and mounting of the optical elements associated with such valves.

Ribbon type light valves, as generally used in the film sound recording art, have been so associated with an optical system that an image of the edges of the ribbons is formed upon the photographic film and the width of this image is varied longitudinally of the film by the movement of the ribbons. Under these conditions, the movements of the ribbons produce a variable time of exposure of a narrow rectangular area of the film without changing the intensity of the light impressed on the film. It is known, however, that a ribbon light valve may be so associated with an optical system that the ribbons of the light valve form an optical stop in the system and thus produce a variation in the intensity of the light impressed upon the film without changing the size of the image formed on the film. The use of a ribbon light valve for this purpose imposes some rather difficult requirements upon the optical system associated with the valve. The present invention discloses means whereby these optical requirements may be met in a neat and compact manner.

The object of the invention is to rigidly mount the elements of the optical system in close association with the ribbons of the light valve.

A feature of the invention is a mounting inserted in an orifice in a pole-piece and secured to the base plate of the light valve.

Another feature of the invention is a mounting inserted in an orifice in a pole-piece of the valve and adapted to support a cylindrical lens or an opaque plate having a light transmitting slit or both a cylindrical lens and a slit plate. A further feature of the invention is a mounting supported in an orifice in a pole-piece of the light valve and adapted to support refractor plates, cylindrical lenses and a slit plate.

In the drawings,

Fig. 1 shows in partial cross-section a light valve for embodying the invention;

Fig. 2 shows in longitudinal cross-section one form of the invention;

Fig. 3 is a cross-section along the lines 3—3 of Fig. 2;

Fig. 4 shows in longitudinal section another form of the invention;

Fig. 5 is a cross-section on the line 5—5 of Fig. 4; and

Fig. 6 is a partial plan view of Fig. 5.

The present invention may be adapted for use with many types of ribbon light valves, but for convenience of description, has been shown associated with a ribbon light valve of the type disclosed in British Patent 479,083 accepted January 31, 1938. The essential elements of such a light valve, as shown in Fig. 1, may comprise a base plate 1 on which is mounted the pole-piece 2 and the ribbon clamps 3 and which also supports the other pole-piece 4 resting upon the spacing member 5. If desired, the base plate 1 and pole-piece 2 may be made as a single integral member. The upper pole-piece 4 is pierced by an aperture 6. Light from a suitable source is projected through the aperture 6 and is modulated by the ribbons suspended between the inner ends of the two pole-pieces. The modulated light is projected through an aperture in the lower pole-piece 2 to the sensitive film. The pole-pieces 2 and 4 may be formed each of a single piece of magnetic material pierced by the central apertures, or may be formed of a number of pieces of magnetic material so shaped and disposed as to define the required apertures. As shown in Figs. 2 and 3, a mounting plate 7 is secured by the screws 8—8 in a recess formed in the base plate 1 and projects into the aperture formed in the lower pole-piece 2. The mounting plate 7 is formed at its inner end to support the cylindrical lens on the axis of the aperture in the pole-piece 2, and is itself formed with a central aperture aligned with the aperture in the pole-piece 2. The cylindrical lens 9 is centrally supported at the proper focal distance from the plane of the light valve ribbons. A slit mount 10 may be supported by the screws 11—11 in a recess formed in the mounting plate 7 to support the slit plate 12 mounted on and cemented to the shoulders formed in the slit mount 10. The slit plate 12 may be of any desired type. A convenient type of slit plate comprises a piece of optical glass having plane parallel sides, covered with an opaque coating of aluminum on one side in which a fine slit is inscribed longitudinally of the slit plate. One or more shims 13 may be inserted between the slit mount 10 and the mounting plate 7 to adjust the position of the fixed slit with reference to the focus of the lens 9. The end walls of the aperture in the mounting plate 7 may have the form of grooves 36 covered with black paint to reduce any stray reflections of light. After the complete unit has been mounted in the pole-piece 2, the masking plates 14—14, affixed to the pole-piece 2, may be placed at the end of the aperture in the pole-piece 2 to exclude any stray light.

As described in the aforesaid British Patent 479,083, light valves of this character may be equipped with two ribbons adapted to form a single record, or with four ribbons adapted to form two records. The two records formed may be independent records, push-pull records, or stereophonic records. The mounting, shown in Figs. 4, 5 and 6, is designed for use with such a four-ribbon light valve.

The modified form of the invention shown in Figs. 4 and 5, is used with a four-ribbon light valve, adapted to make two simultaneous film sound records. As shown in Fig. 6, the pole-piece of this type of light valve preferably consist of four sections 15, 16, 17, 18 attached to the base plate of the light valve so as to form two light transmitting slots 19, 20 offset with respect to the center line of the light valve, though, if desired, the pole-piece may be a single member and may be combined with the base plate to form a single integral member. A mounting plate 21 is secured by the screws 22—22 in a recess formed in the base plate 1 of the light valve. The mounting plate 21 is shaped to fit into an aperture formed in the pole-piece sections 15, 16 and 17, 18. The inner end of the projecting portion of the mounting plate 21 is shaped to support a cartridge-shaped container carrying two refractor plates 24 and 25. The refractor plates 24 and 25 laterally displace the beams of light projected through the offset apertures in the pole-piece to align both beams of light on the center line of the aperture formed in the mounting plate 21.

The two cylindrical lenses 26 and 27 are supported in the apertures formed in the mounting plate 21 adjacent to the refractor plates 24, 25. The position of the mounting plate 21 may be adjusted by the insertion of one or more shims 28 placed between the mounting plate 21 and the base plate 1 of the light valve. A slit plate 29 supported by, and if desired, cemented to, the slit mounting plate 30 is secured by the screws 31 in a recess formed in the mounting plate 21. The position of the slit plate 29 may be adjusted by means of shims 32 placed between the slit mounting plate 30 and the mounting plate 21. The slit plate 29 may be of the same general type as the slit plate 12 in Fig. 2. In order to prevent stray light from one beam from being transmitted laterally to the optical system of the other beam, an opaque separator 33 is placed between the two refractor plates 24, 25, and the inner ends of the cylindrical lenses 26 and 27 are separated by some opaque substance such as a piece of black paper 34 and a septum 35 formed of some suitable opaque material such as sheet metal is placed between the slit plate 29 and the cylindrical lenses 26 and 27. The end walls of the aperture in the mounting plate 21 may have the form of grooves 36 similar to the grooves in the plate 7, Fig. 2.

Many modifications may be made in the invention when used with various types of ribbon light valves. For example, in some cases the cylindrical lenses shown may be replaced by spherical lenses. In Figs. 2 and 3, by removing the slit plate 12, the cylindrical lens may be used alone, and conversely by removing the cylindrical lens, the slit plate 12 may be used alone. Similarly in Figs. 4 and 5, the refractor plates 24, 25 may be used alone or in conjunction with the cylindrical lenses 26, 27, or the slit plate 29, or as shown with the cylindrical lenses and the slit plate.

What is claimed is:

1. In a light valve having an apertured pole-piece, a mounting plate projecting into the aperture in said pole-piece, said mounting plate having an aperture aligned with the aperture in said pole-piece, an opaque plate attached to and supported by said mounting plate and having a light transmitting slit centrally located in the aperture in said mounting plate.

2. In a light valve having an apertured pole-piece, a mounting plate projecting into the aperture in said pole-piece, said mounting plate having an aperture aligned with the aperture in said pole-piece, and a recess at the outer end of said aperture, a member mounted in said recess and attached to said mounting plate and an opaque plate attached to and supported by said member and having a light transmitting slit on the axis of the aperture in said mounting plate.

3. In a light valve having an apertured pole-piece, a mounting plate projecting into the aperture in said pole-piece, said mounting plate having an aperture aligned with the aperture in said pole-piece, and a lens supported by said mounting plate centrally in the aperture in said plate.

4. In a light valve having an apertured pole-piece, a mounting plate projecting into the aperture in said pole-piece, said mounting plate having an aperture aligned with the aperture in said pole-piece, and a cylindrical lens supported by said mounting plate centrally at the inner end of the aperture in said mounting plate.

5. In a light valve having an apertured pole-piece, a mounting plate projecting into the aperture in said pole-piece, said mounting plate having an aperture aligned with the aperture in said pole-piece, a cylindrical lens supported by said mounting plate centrally at the inner end of the aperture in said mounting plate, and an opaque plate supported by said mounting plate at the outer end of the aperture in said mounting plate and having a light transmitting slit aligned with the center of said aperture.

6. In a light valve having a pole-piece provided with a pair of apertures displaced in opposite directions with respect to the axis of the pole-piece supported by said plate, a mounting plate projecting into the apertures in said pole-piece, said mounting plate having apertures aligned with the apertures in said pole-piece, an opaque plate attached to and supported by said mounting plate at the outer end of said apertures and having light transmitting slits centrally aligned in said apertures, and an opaque septum in contact with said opaque plate and centrally located in said aperture between the apertures in said pole-pieces.

7. In a light valve having a pole-piece provided with a central aperture terminating at one end in a pair of apertures displaced in opposite directions with respect to the axis of the pole-piece, a mounting plate projecting into the central aperture in said pole-piece, said mounting plate having an aperture aligned with the aperture in the pole-piece, a pair of cylindrical lenses mounted in the aperture in said mounting plate, and an opaque member located in said aperture between the ends of said cylindrical lenses.

8. In a light valve having a pole-piece provided with a central aperture terminating in a pair of apertures displaced in opposite directions with respect to the axis of the pole-piece, a mounting plate projecting into the aperture in said pole-piece, said mounting plate having an aperture aligned with the central aperture in said pole-piece, a pair of cylindrical lenses mounted in the inner end of the aperture in said mounting plate, an opaque plate mounted in the outer end of the aperture in said mounting plate and having a light transmitting slit and an opaque member between the inner ends of said lenses and extending centrally in said aperture to the center of said light transmitting slit.

9. In a light valve having a pole-piece provided with a central aperture terminating in a pair of apertures displaced in opposite directions with respect to the axis of the pole-piece, a mounting plate projecting into the central aperture in said pole-piece, said mounting plate having an aperture aligned with the central aperture in said pole-piece, optical means mounted in the inner end of the aperture in said mounting plate for displacing the light transmitted through the pair of apertures in said pole-piece to the axis of the central aperture, a pair of cylindrical lenses mounted in said aperture adjacent to said optical means, and an opaque plate attached to and supported by said mounting plate at the outer end of the aperture in said mounting plate, said opaque plate having a light transmitting slit aligned with the center of said aperture.

10. In a light valve having a pole-piece provided with a central aperture terminating in a pair of apertures displaced in opposite directions with respect to the axis of the pole-piece, a mounting plate projecting into the central aperture in said pole-piece, said mounting plate having an aperture aligned with the central aperture in said pole-piece, a pair of optical elements supported by said mounting plate at the inner end of said aperture for displacing the beam projected through the pair of apertures in said pole-piece to the axis of the central aperture, a pair of cylindrical lenses supported by said mounting plate centrally in said aperture adjacent to said optical elements, an opaque plate attached to and supported by said mounting plate at the outer end of said aperture, said opaque plate having a light transmitting slit aligned with the axis of said aperture, and opaque separating means located between said optical elements, between said cylindrical lenses and extending to the center of the slit in said opaque member.

EMANUEL C. MANDERFELD.